US008970811B2

(12) United States Patent
Park et al.

(10) Patent No.: US 8,970,811 B2
(45) Date of Patent: Mar. 3, 2015

(54) OPTICAL FILM FOR REDUCING COLOR SHIFT AND LIQUID CRYSTAL DISPLAY HAVING THE SAME

(75) Inventors: Seong-Sik Park, ChungCheongNam-Do (KR); EunYoung Cho, ChungCheongNam-Do (KR)

(73) Assignee: Samsung Corning Precision Materials Co., Ltd. (KR)

( * ) Notice: Subject to any disclaimer, the term of this patent is extended or adjusted under 35 U.S.C. 154(b) by 195 days.

(21) Appl. No.: 13/347,084

(22) Filed: Jan. 10, 2012

(65) Prior Publication Data

US 2012/0176572 A1 Jul. 12, 2012

(30) Foreign Application Priority Data

Jan. 11, 2011 (KR) .................. 10-2011-0002670

(51) Int. Cl.
*G02F 1/1335* (2006.01)
*G02B 3/00* (2006.01)
*G02B 5/02* (2006.01)
*G02B 27/00* (2006.01)

(52) U.S. Cl.
CPC .............. *G02B 3/005* (2013.01); *G02B 3/0068* (2013.01); *G02B 5/0236* (2013.01); *G02B 5/0278* (2013.01); *G02B 27/0018* (2013.01); *G02F 1/133526* (2013.01)
USPC ............................................. 349/95; 349/62

(58) Field of Classification Search
CPC .................... G02B 27/0018; G02B 2027/0129
USPC ............................................. 349/112, 95, 62
See application file for complete search history.

(56) References Cited

U.S. PATENT DOCUMENTS

| 6,297,908 | B1 | 10/2001 | Suga | |
| 6,980,728 | B2 * | 12/2005 | Ladstatter et al. | ............ 385/146 |
| 2006/0109399 | A1 | 5/2006 | Kubota et al. | |

(Continued)

FOREIGN PATENT DOCUMENTS

| CN | 1776505 A | 5/2006 |
| CN | 101271221 A | 9/2008 |

(Continued)

OTHER PUBLICATIONS

WO 2011/068168 Umeda et al., Light Diffusion Sheet, Method for Manufacturing Same, and Transmissive Display Device Provide with Light Diffusion Sheet.*

(Continued)

*Primary Examiner* — Edward Glick
*Assistant Examiner* — Mark Teets
(74) *Attorney, Agent, or Firm* — Lerner, David, Littenberg, Krumholz & Mentlik, LLP

(57) ABSTRACT

An optical film for reducing color shift in an LCD is disposed in front of a liquid crystal panel of the LCD. The optical film includes a background layer, a plurality of engraved lens sections formed in the background layer such that the engraved lens sections are spaced apart from each other, and packed portions, each of the packed portions being disposed inside a respective one of the engraved lens sections. The refractive index of the packed portions is different from that of the background layer. The packed portions are partially packed inside the engraved lens sections. The refractive index of the packed portions is greater than that of the background layer. The background layer and the packed portions are made of transparent polymer resin.

11 Claims, 14 Drawing Sheets

(56) References Cited

U.S. PATENT DOCUMENTS

| | | | |
|---|---|---|---|
| 2006/0109681 A1* | 5/2006 | Kim et al. | 362/606 |
| 2007/0229737 A1 | 10/2007 | Takeda | |
| 2008/0106679 A1 | 5/2008 | Kanemitsu et al. | |
| 2008/0303777 A1* | 12/2008 | Inoue et al. | 345/102 |
| 2010/0014313 A1* | 1/2010 | Tillin et al. | 362/606 |
| 2010/0177396 A1 | 7/2010 | Lin | |
| 2012/0268826 A1* | 10/2012 | Umeda et al. | 359/599 |

FOREIGN PATENT DOCUMENTS

| | | |
|---|---|---|
| DE | 4447449 A1 | 7/1996 |
| EP | 0640850 A2 | 3/1995 |
| JP | 2009042657 A | 2/2009 |
| KR | 1020080060732 | 7/2008 |
| KR | 1020090014734 A | 2/2009 |
| KR | 1020100134318 | 12/2010 |
| WO | 9937949 A1 | 7/1999 |

OTHER PUBLICATIONS

Chinese Office Action for Application No. 201210007441.5 dated Dec. 9, 2013.

\* cited by examiner

OPTICAL FILM FOR REDUCING COLOR SHIFT AND LIQUID CRYSTAL DISPLAY HAVING THE SAME

BACKGROUND OF THE INVENTION

1. Field of the Invention

The present invention relates to an optical film for reducing color shift and a liquid crystal display (LCD) having the same, and more particularly, to an optical film for reducing color shift and an LCD having the same, in which engraved lens sections are formed to reduce color shift depending on the viewing angle.

2. Description of Related Art

In response to the emergence of the advanced information society, components and devices related to image displays have been significantly improved and rapidly disseminated. Among them, image display devices have been widely distributed for use in TVs, personal computer (PC) monitors, and the like. Moreover, attempts are underway to simultaneously increase the size and reduce the thickness of such display devices.

In general, a liquid crystal display (LCD) is one type of flat panel display, and displays images using liquid crystals. The LCD is widely used throughout industry since it has the advantages of light weight, low drive voltage, and low power consumption compared to other display devices.

FIG. 1 is a conceptual view schematically showing the basic structure and operating principle of an LCD 100.

With reference by way of example to a conventional vertical alignment (VA) LCD, two polarizer films 110 and 120 are arranged such that their optical axes are oriented perpendicular to each other. Liquid crystal molecules 150 having birefringence characteristics are interposed and arranged between two transparent substrates 130, which are coated with transparent electrodes 140. When an electric field is applied from a power supply unit 180, the liquid crystal molecules move and are aligned perpendicular to the electric field.

Light emitted from a backlight unit is linearly polarized after passing through the first polarizer film 120. As shown in the left of FIG. 1, the liquid crystal molecules remain perpendicular to the substrates when no power is applied. As a result, light that is in a linearly polarized state is blocked by the second polarizer film 110, the optical axis of which is perpendicular to that of the first polarizer film 120.

In the meantime, as shown in the right of FIG. 1, when power is on, the electric field causes the liquid crystal molecules to become horizontally aligned such that they are parallel to the substrates, between the two orthogonal polarizer films 110 and 120. Thus, the linearly polarized light from the first polarizer film is converted into another kind of linearly polarized light, the polarization of which is rotated by 90°, circularly polarized light, or elliptically polarized light while passing through the liquid crystal molecules before it reaches the second polarizer film. The converted light is then able to pass through the second polarizer film. It is possible to gradually change the orientation of the liquid crystal from the vertical orientation to the horizontal orientation by adjusting the intensity of the electric field, thereby allowing control of the intensity of light emission.

FIG. 2 is a conceptual view showing the orientation and optical transmittance of liquid crystals depending on the viewing angle.

When liquid crystal molecules are aligned in a predetermined direction within a pixel 220, the orientation of the liquid crystal molecules varies depending on the viewing angle.

When viewed from the front left (210), the liquid crystal molecules look as if they are substantially aligned along the horizontal orientation 212, and the screen is relatively bright.

When viewed from the front along the line 230, the liquid crystal molecules are seen to be aligned along the orientation 232, which is the same as the orientation inside the pixel 220. In addition, when viewed from the front left (250), the liquid crystal molecules look as if they are substantially aligned along the vertical orientation 252, and the screen is somewhat darker.

Accordingly, the viewing angle of the LCD is greatly limited compared to other displays, which intrinsically emit light, since the intensity and color of light of the LCD varies depending on changes in the viewing angle. A large amount of research has been carried out with the aim of increasing the viewing angle.

FIG. 3 is a conceptual view showing a conventional attempt to reduce variation in the contrast ratio and color shift depending on the viewing angle.

Referring to FIG. 3, a pixel is divided into two pixel parts, that is, first and second pixel parts 320 and 340, in which the orientations of liquid crystals are symmetrical to each other. Either the liquid crystals oriented as shown in the first pixel part 320 or the liquid crystals oriented as shown in the second pixel part 340 can be seen, depending on the viewing direction of a viewer. The intensity of light reaching the viewer is the total intensity of light of the two pixel parts.

When viewed from the front left (310), liquid crystal molecules in the first pixel part 320 look as if they are aligned along the horizontal orientation 312, and liquid crystal molecules in the second pixel part 320 look as if they are aligned along the vertical orientation 314. Thus, the first pixel part 320 makes the screen look bright. Likewise, when viewed from the front right (350), the liquid crystal molecules in the first pixel part 320 look as if they are aligned along the vertical orientation 352, and the liquid crystal molecules in the second pixel part 340 look as if they are aligned along the horizontal orientation 354. Then, the second pixel part 340 can make the screen look bright. In addition, when viewed from the front, the liquid crystal molecules are seen to be aligned along the orientations 332 and 334, which are the same as the orientations inside the pixel parts 320 and 340. Accordingly, the brightness of the screen observed by the viewer remains the same or similar, and is symmetrical about the vertical center line of the screen, even when the viewing angle changes. This, as a result, makes it possible to reduce variation in the contrast ratio and color shift depending on the viewing angle.

FIG. 4 is a conceptual view showing another conventional approach for reducing variation in the contrast ratio and color shift depending on to the viewing angle.

Referring to FIG. 4, an optical film 420 having birefringence characteristics is added. The birefringence characteristics of the optical film 420 are the same as those of liquid crystal molecules inside a pixel 440 of an LCD panel, and are symmetrical with the orientation of the liquid crystal molecules. Due to the orientation of the liquid crystal molecules inside the pixel 440 and the birefringence characteristics of the optical film, the intensity of light reaching the viewer is the total intensity of light from the optical film 420 and the pixel 440.

Specifically, when viewed from the front left (410), the liquid crystal molecules inside the pixel 440 look as if they are aligned along the horizontal orientation 414, and the imaginary liquid crystals produced by the optical film 420 look as if they are aligned along the vertical orientation 412. The resultant intensity of light is the total intensity of light from the optical film 420 and the pixel 440. Likewise, when viewed from the front right (450), the liquid crystal molecules inside the pixel 440 look as if they are aligned along the vertical orientation 454 and the imaginary liquid crystals produced by the optical film 420 look as if they are aligned along the horizontal orientation 452. The resultant intensity of light is the total intensity of light from the optical film 420 and the pixel 440. In addition, when viewed from the front, the liquid crystal molecules are seen to be aligned along the orientations 434 and 432, which are the same as the orientation inside the pixel 440 and the double-refracted orientation of the optical film 420, respectively.

However, even if the approaches described above are applied, there remains the problem shown in FIG. 5. That is, color shift still occurs depending on the viewing angle, and the color changes when the viewing angle increases.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an optical film for reducing color shift that can reduce color shift in response to an increase in the viewing angle and an LCD having the same.

Also provided are an optical film for reducing color shift that can prevent ghosting and hazing while reducing color shift and an LCD having the same.

Also provided are an optical film for reducing color shift that exhibit excellent transmissivity while reducing color shift and an LCD having the same.

In an aspect of the present invention, the optical film for reducing color shift in an LCD is disposed in front of a liquid crystal panel of the LCD, and includes a background layer, a plurality of engraved lens sections formed in the background layer such that the engraved lens sections are spaced apart from each other, and packed portions, each of the packed portions being disposed inside a respective one of the engraved lens sections. The refractive index of the packed portions is different from that of the background layer.

In an embodiment, the packed portions may be partially packed inside the engraved lens sections.

In an embodiment, the refractive index of the packed portions may be greater than that of the background layer.

In an embodiment, the background layer and the packed portions may be made of transparent polymer resin.

In the optical film for reducing color shift and the LCD having the same according to embodiments of the present invention, ghosting and hazing are prevented while color shift in response to an increase in the viewing angle is reduced.

In addition, in the optical film for reducing color shift and the LCD having the same according to embodiments of the present invention, excellent transmissivity is exhibited.

The methods and apparatuses of the present invention have other features and advantages which will be apparent from, or are set forth in greater detail in the accompanying drawings, which are incorporated herein, and in the following Detailed Description of the present invention, which together serve to explain certain principles of the present invention.

DETAILED DESCRIPTION OF THE INVENTION

Reference will now be made in detail to various embodiments of the present invention, examples of which are illustrated in the accompanying drawings and described below. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

Comparative Examples

A description will be given below of comparative examples. The principle of reducing color shift of the present invention is described first, and then the mechanism of preventing ghosting and hazing using engraved lens sections is described.

Figure 6:
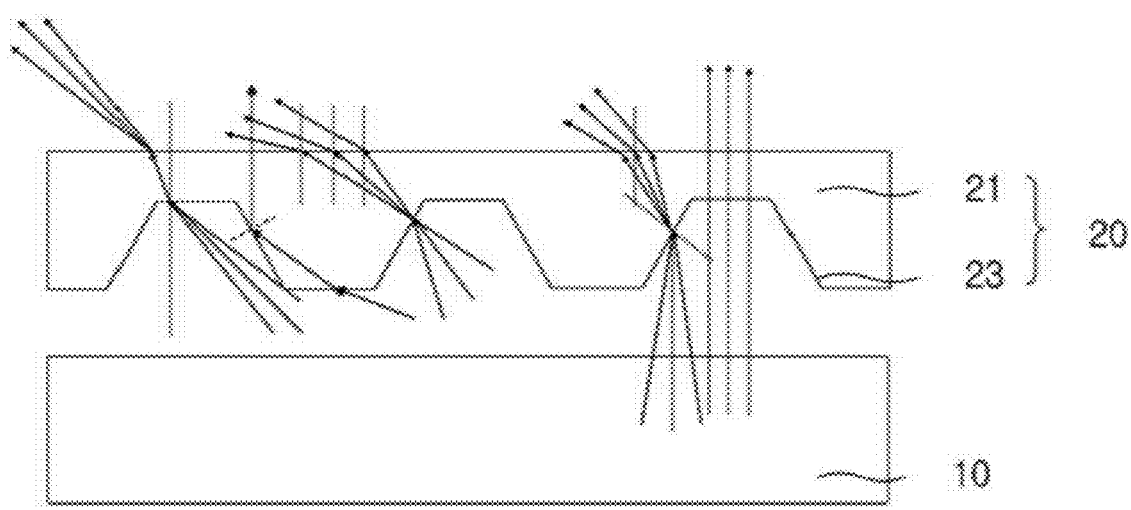
FIG. 6 to FIG. 12 are cross-sectional views showing optical films for reducing color shift according to comparative examples.
Figure 7:
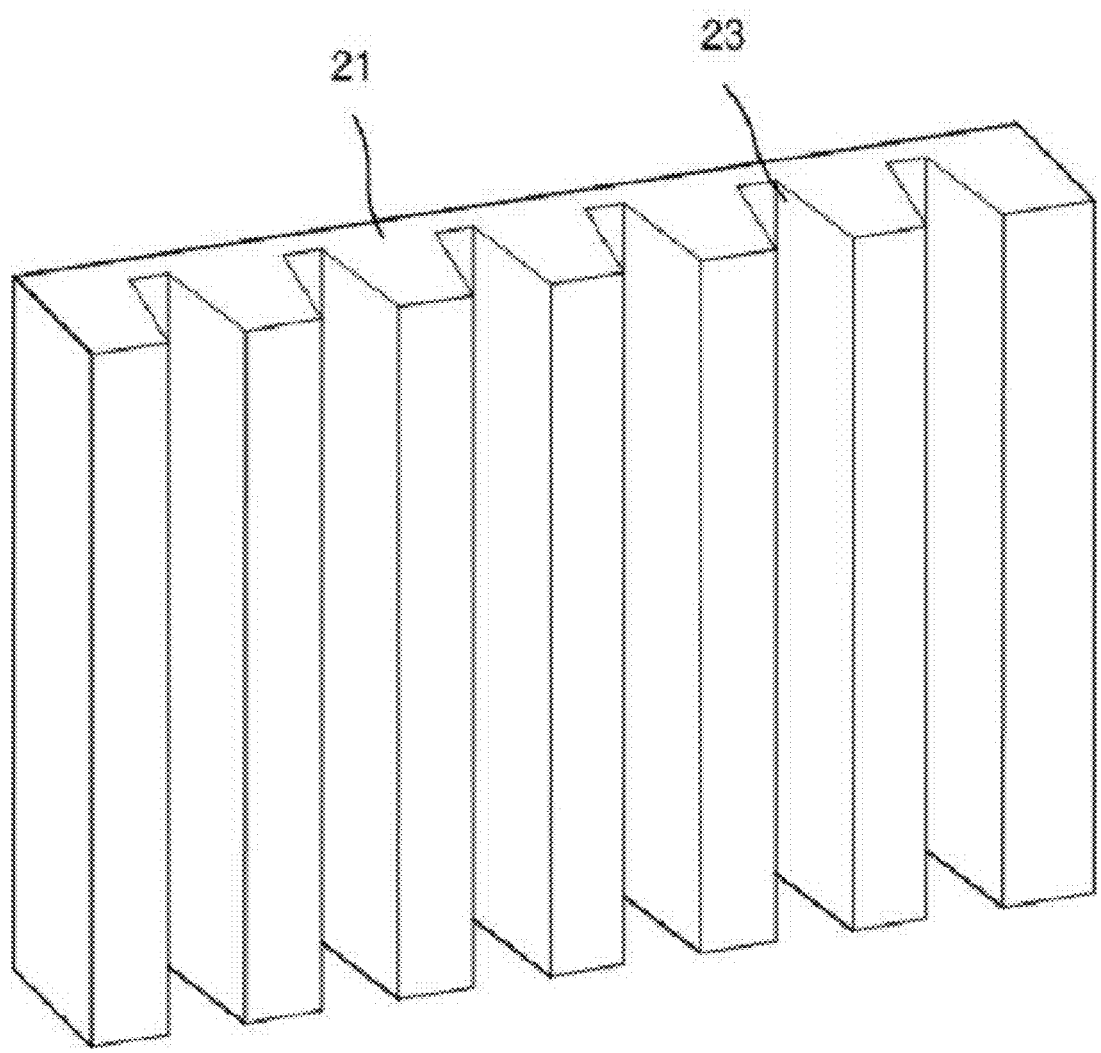

FIG. 6 and FIG. 7 are cross-sectional views showing lens sections of an optical film according to a first comparative example.

The optical film is typically disposed in front of a display panel 10.

As shown in the figures, the optical film 20 includes a background layer 21 and lens sections 23.

The background layer 21 is formed as a layer of light-transmitting material. The background layer 21 may be made of transparent polymer resin, in particular, ultraviolet (UV) curing transparent resin.

The lens sections 23 are formed by engraving the background layer 21 to a predetermined depth. The lens sections 23 reduce color shift by refracting light that is incident thereon. The lens sections 23 can reduce the color change that occurs in response to an increase in the viewing angle using a color mixing effect. It is possible to allow more of the light that is emitted in the direction perpendicular to the plane of the display panel to pass through by reducing the width such that it is smaller than the spacing between the lens sections.

The lens sections 23 serve to change the direction of light that is emitted perpendicular to the plane of the display panel, such that it is not perpendicular thereto, and to change the direction of the portion of light that is not originally emitted perpendicular thereto, such that it is emitted perpendicular thereto. That is, the lens sections can cause color mixing by changing the direction of light based on the viewing angle, thereby reducing color shift.

The lens sections 23 may have a pattern selected from among, but not limited to, stripes having a polygonal cross-section, waves having a polygonal cross-section, a matrix having a polygonal cross-section, a honeycomb having a polygonal cross-section, dots having a polygonal cross-section, stripes having a semicircular cross-section, waves having a semicircular cross-section, a matrix having a semicircular cross-section, a honeycomb having a semicircular cross-section, dots having a semicircular cross-section, stripes having a semi-elliptical cross-section, waves having a semi-elliptical cross-section, a matrix having a semi-elliptical cross-section, a honeycomb having a semi-elliptical cross-section, dots having a semi-elliptical cross-section, stripes having a semi-oval cross-section, waves having a semi-oval cross-section, a matrix having a semi-oval cross-section, a honeycomb having a semi-oval cross-section, and dots having a semi-oval cross-section. The lens sections are not limited to the above-described shapes, but may have a variety of shapes. It is preferred that the lens section have a bilaterally symmetrical cross-section.

Here, the term "polygonal cross-section" may include, but is not limited to, triangular, trapezoidal and quadrangular cross-sections. In addition, the term "semi-oval cross-section" may include curved profiles other than an arc of a circle and an arc of an ellipse. Further, the terms "semicircular cross-section," "semi-elliptical cross-section," and "semi-oval cross-section" are not limited to the shapes that are obtained by dividing circular, elliptical, or oval shapes precisely into two sections, but include shapes in which part of the outline of the cross-section of the lens sections includes an arc, an elliptical arc, or a curve. That is, the "semi-elliptical cross-section" may have a shape that has two elliptical arc lateral sides and a linear upper (or lower) side (i.e., a trapezoidal shape in which both inclined sides are arcs of an ellipse).

In addition, the pattern constituted of stripes may also include a variety of patterns, such as a horizontal stripe pattern, a vertical stripe pattern, and the like. The horizontal stripe pattern is effective in compensating for vertical viewing angles. The vertical stripe pattern, as shown in FIG. 7, is effective in compensating for horizontal viewing angles.

In order to prevent a moiré phenomenon, the lens sections 23 may be formed to have a predetermined bias angle with respect to the edge of the background layer 21. For example, in the stripe pattern, the stripes may have a predetermined angle of inclination with respect to the horizontal or vertical direction.

It is preferred that the lens sections 23 be periodically formed on one surface of the background layer 21, as shown in FIG. 7. The recesses are spaced apart from each other and are parallel to each other.

The lens sections 23 may be formed on a surface that is directed toward a viewer, or on a surface that is directed toward the display panel. Alternatively, the lens sections 23 may be formed on both surfaces of the background layer 21.

Figure 8:
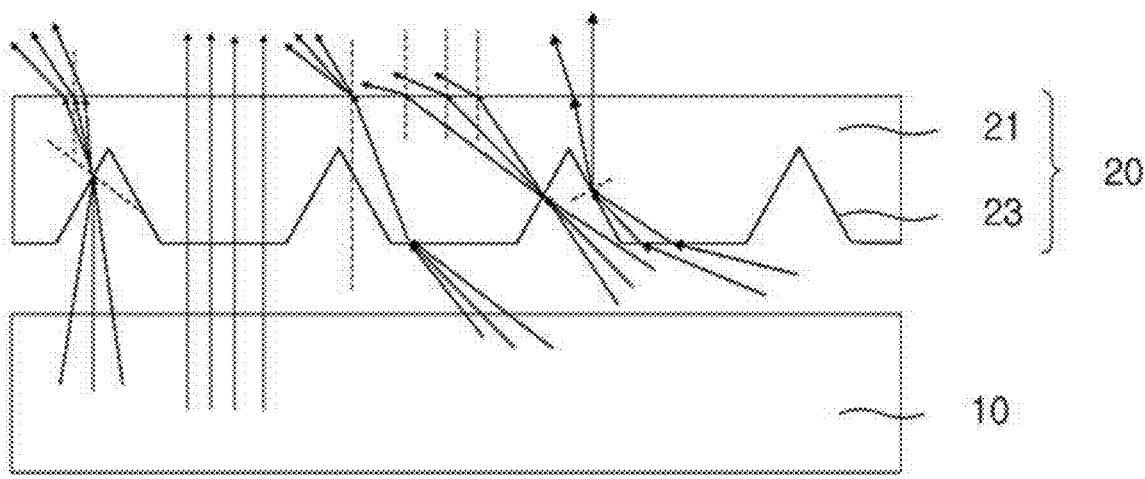
Figure 9:
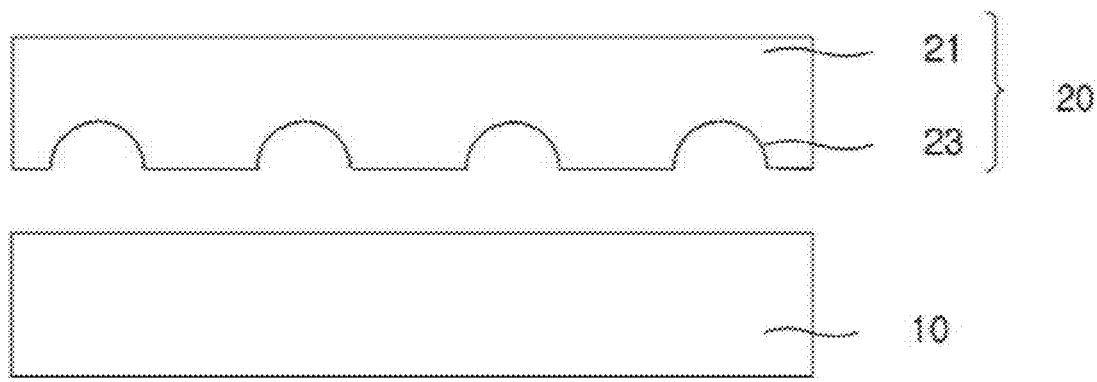

FIG. 8 is a cross-sectional view showing an optical film according to a second comparative example, and FIG. 9 is a cross-sectional view showing an optical film according to a third comparative example.

These figures show that the lens sections may have a triangular or semicircular cross-section.

Figure 10:
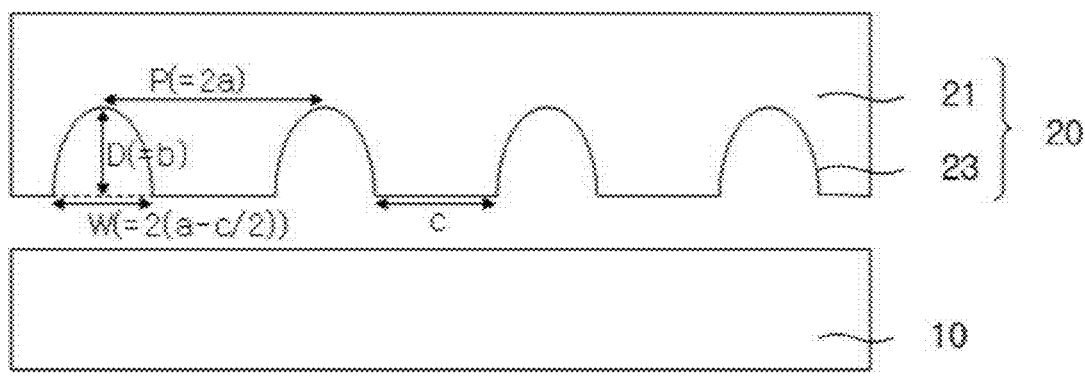
Figure 11:
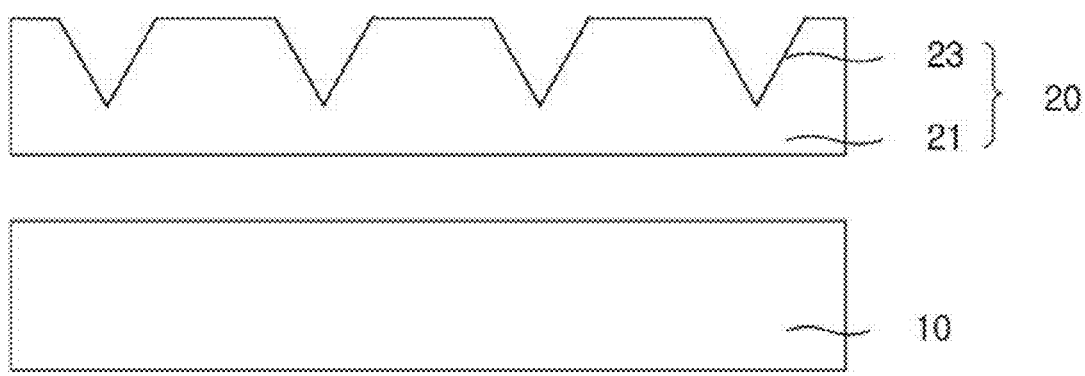

FIG. 10 and FIG. 11 are cross-sectional views showing optical films according to fourth and fifth comparative examples, respectively.

Although the lens sections may be formed on the rear surface of the background layer, which faces the display panel, they may be formed on the front surface of the background layer, which is directed toward the viewer, as shown in the figures.

Figure 12:
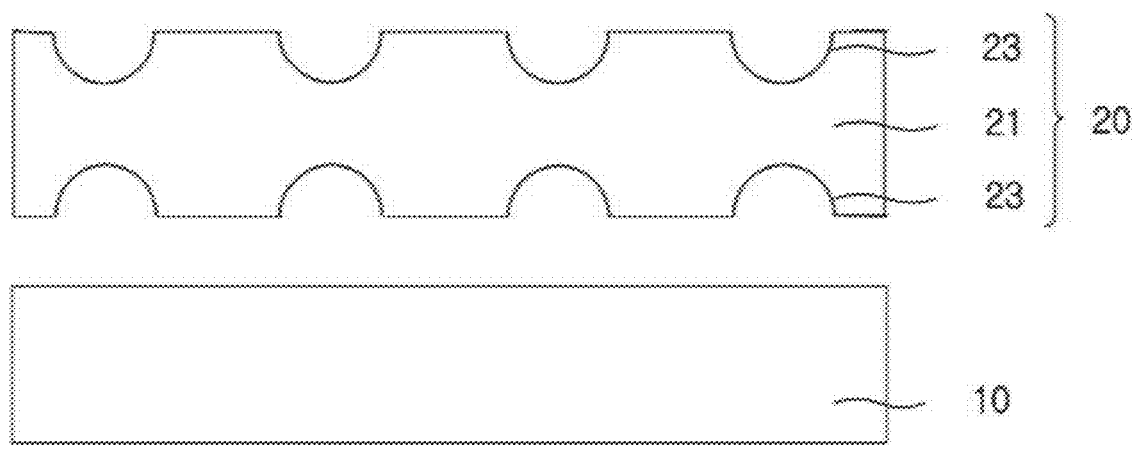

FIG. 12 is a cross-sectional view showing an optical film according to a sixth comparative example.

As shown in FIG. 12, the lens sections may be formed on both surfaces of the background layer.

Figure 13:
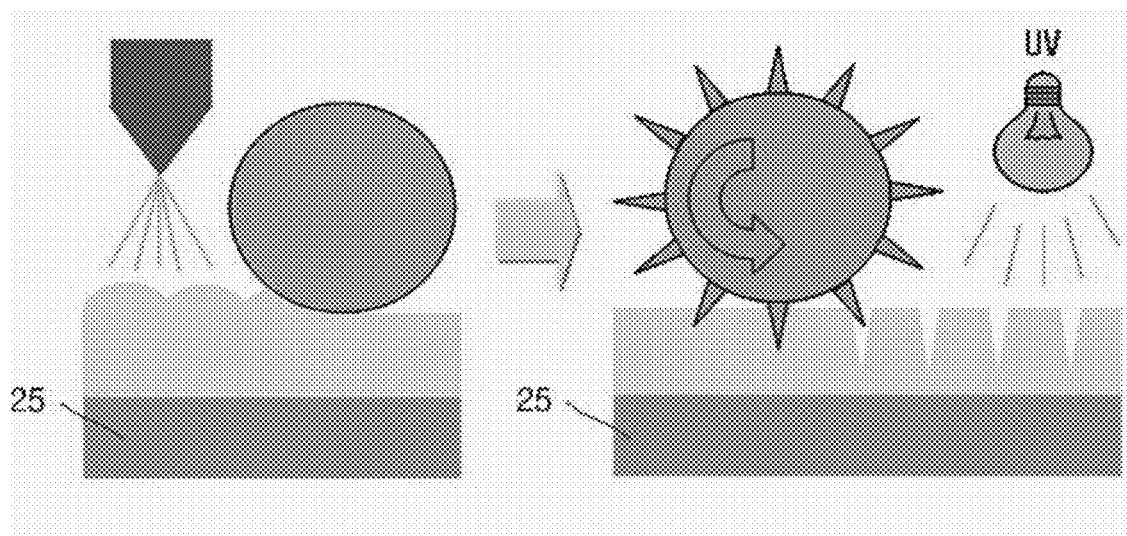
FIG. 13 is a view showing a method of manufacturing an optical film according to a comparative example.

FIG. 13 is a view showing a method of manufacturing an optical film according to a seventh comparative example.

The optical film for reducing color shift may have a backing 25, which supports the background layer 21.

The backing 25 is, preferably, a transparent resin film or a glass substrate that is UV transparent. Available examples of material for the backing 25 may include, but are not limited to, polyethylene terephthalate (PET), polycarbonate (PC), polyvinyl chloride (PVC), and triacetate cellulose (TAC).

A method of preparing the lens sections 23 includes the step of applying a UV-curable resin on one surface of the backing 25, and the step of forming lens sections in the UV-curable resin using a forming roll that has a pattern reverse to that of the lens sections on the surface thereof while radiating UV rays onto the UV-curable resin. Afterwards, the preparation of the background layer 21 having the lens sections 23 is finalized by radiating UV rays onto the UV-curable resin.

However, the lens sections are not limited thereto, but may be formed using a variety of methods, such as thermal pressing, which uses thermoplastic resin, injection molding, in which thermoplastic resin or thermosetting resin is injected, or the like.

Figure 14:
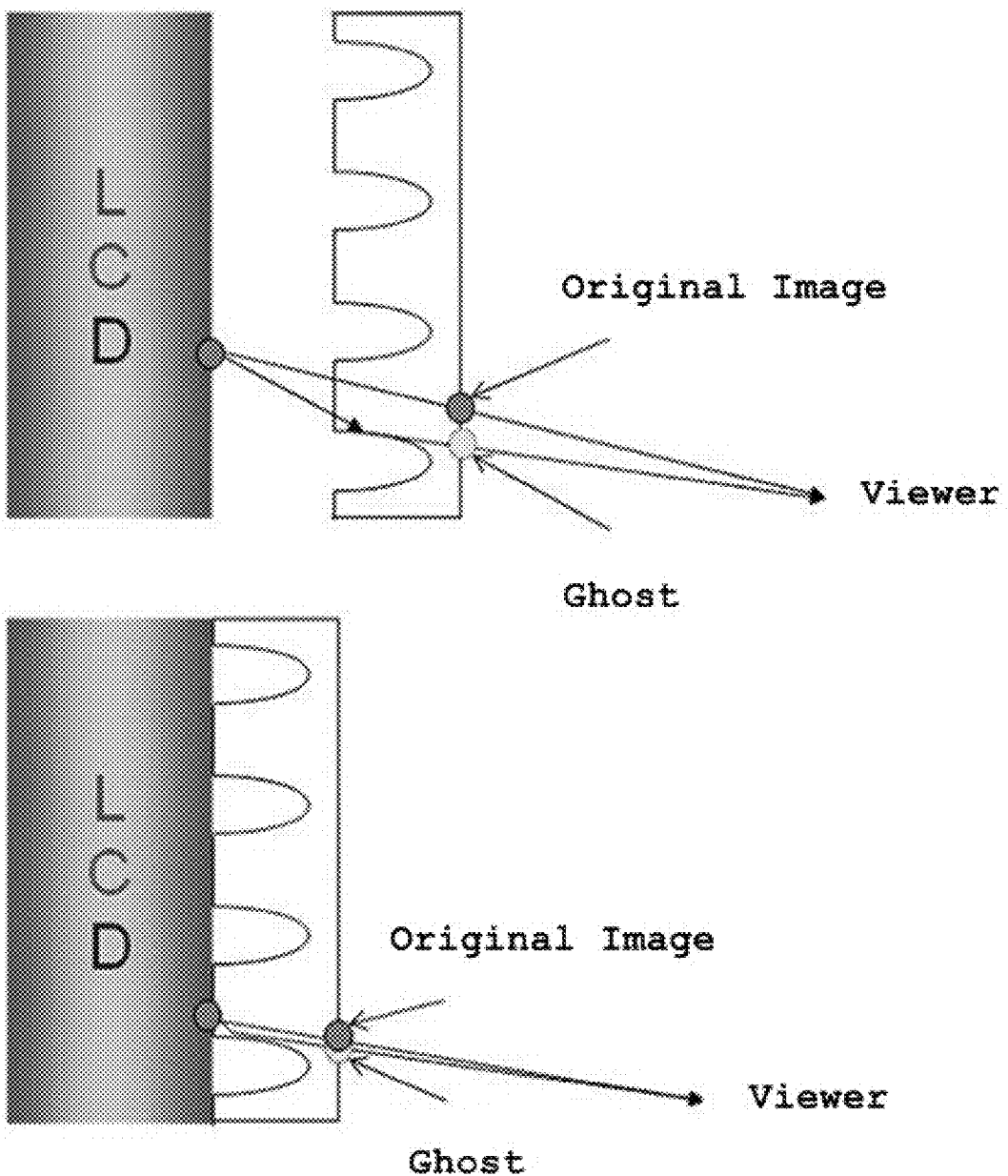
FIG. 14 to FIG. 17 are views showing that ghosts and hazing occur when an optical film for reducing color shift according to comparative examples is spaced apart from a display panel.
Figure 15:
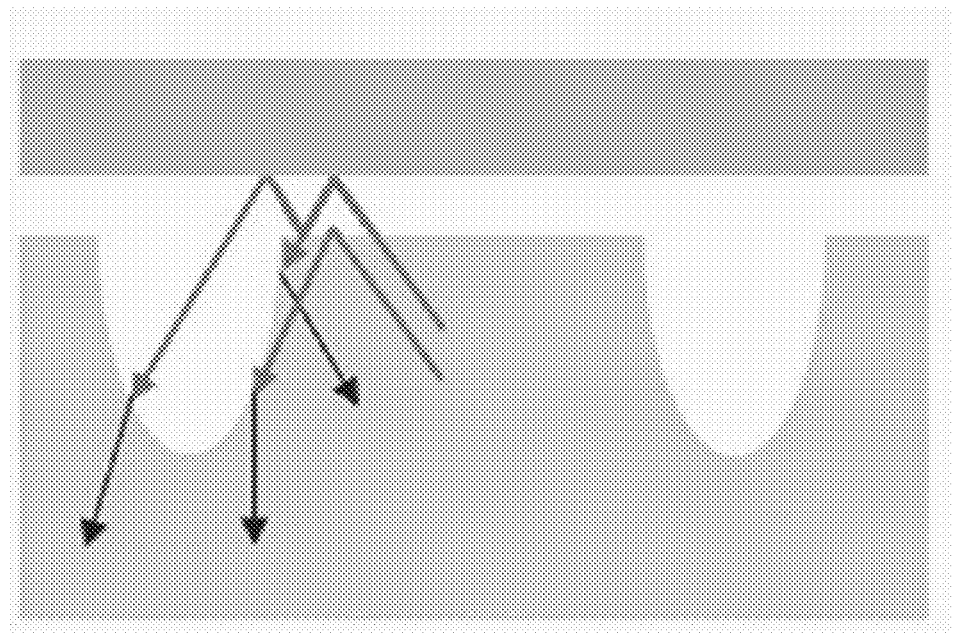

FIG. 14 and FIG. 15 are views showing that ghosts and hazing occur when the optical film for reducing color shift is spaced apart from the display panel.

When the optical film for reducing color shift is mounted in front of the display panel, spacing the optical film farther apart from the display panel makes the ghost look more distinct, as shown in FIG. 14. (When the optical film is in close contact with the display panel, it is difficult to distinguish the ghost from the original image because the gap between the ghost and the original image is very small, as will be described below.) The ghost distorts the image on the display panel. Therefore, a solution that can prevent ghosts while reducing color shift is required.

In addition, when the optical film for reducing color shift is disposed such that it is spaced apart from the display panel, not only the foregoing problem of ghosts, but also the problem of hazing occurs, as shown in FIG. 15, since the lens sections diffuse light reflected from the display panel and the flat surfaces between the lens sections. That is, light entering onto the optical film and the display panel is reflected, one or multiple times, i) from the interface between the optical film and the air (i.e., the air between the optical film and the display panel) and ii) from the interface between the air and the display panel, and is then incident onto the lens sections. The lens sections diffuse the incident light, which causes hazing. This phenomenon reduces bright-room contrast ratio (BRCR), thereby reducing the visibility of the display device. Therefore, a solution that can prevent ghosts and hazing from occurring in the optical film for reducing color shift is required.

Figure 16:
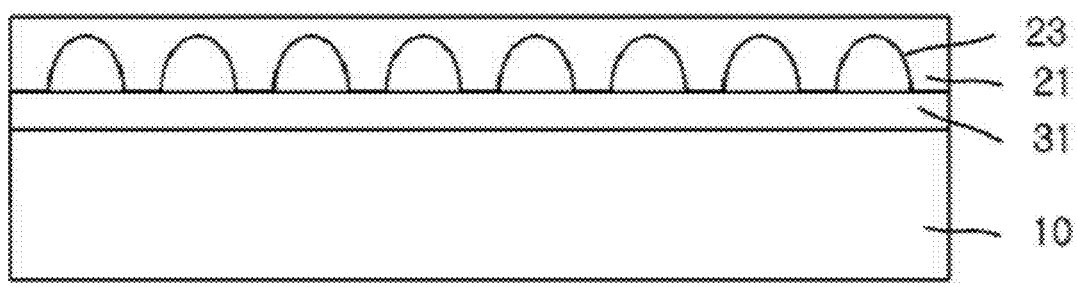
Figure 17:
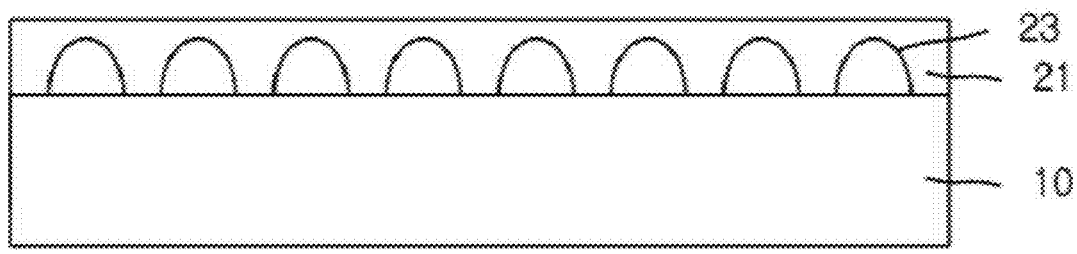

FIG. 16 and FIG. 17 are views schematically showing display devices according to ninth and tenth comparative examples, which are designed to remove ghosts and hazing in an optical film for reducing color shift.

It is possible to remove ghosts and hazing by bringing the optical film into close contact with the display panel. For example, it is possible to prevent ghosts and hazing and improve transmittance by attaching the optical film for reducing color shift to the display panel by means of an adhesive, as shown in FIG. 16, or by forming a background layer from a material having a self-adhesive property and then directly attaching the background layer to the display panel, as shown in FIG. 17. In addition, it is also possible to simply bring the optical film into close contact with the display panel without adhering it thereto such that no air gap is interposed between the optical film and the display panel.

When ghosts are observed, it was found that lens sections having a semi-elliptical cross-section can most effectively prevent ghosting. It is also preferable that the lens sections be directed toward the display panel instead of toward the viewer, in terms of reducing hazing. (This is the same when the optical film for reducing color shift is spaced apart from the display panel.)

Here, the background layer may be made of UV-curable transparent elastomer such that it can be easily attached directly to the display panel. Available materials for the background layer may include, but are not limited to, acrylic elastomer, silicone-based elastomer (polydimethylsiloxane: PDMS), urethane-based elastomer, polyvinyl butyral (PMB) elastomer, ethylene vinyl acetate (EVA)-based elastomer, polyvinyl ether (PVE)-based elastomer, saturated amorphous polyester-based elastomer, melamine resin-based elastomer, and the like.

Table 1 below presents the results obtained by measuring hazing in a display device in which the optical film for reducing color shift is spaced apart from the display panel, and in the display device shown in FIG. 16.

TABLE 1

| Sample | Luminance measured at a viewing angle of 60° |
|---|---|
| Black panel | 1.73 nit |
| Display panel/Air/Film having lens sections with semi-elliptical cross-section | 12.27 nit |
| Display panel/PSA/Film having lens sections with semi-elliptical cross-section | 2.58 nit |
| Display panel/Air/PET film | 3.87 nit |

Measurement was carried out using illuminant D65, having 240 lux as an external light source by attaching the samples to black substrates and then measuring the luminance of reflected light at a horizontal viewing angle of 60°. Since the external light source exists at a place higher than the samples, specular reflection could be observed from below the samples, and irregular reflection could be observed from all directions. Therefore, the reflection hazing caused by external light was measured by detecting irregularly reflected light at a horizontal viewing angle of 60°, rather than from below the samples.

When the optical film for reducing color shift was adhered to the display panel, the reflection haze was measured to be 2.58 nit, which is very small compared to when the optical film was spaced apart from the display panel to thus form an air gap therebetween. It can be appreciated that the reflection hazing was significantly reduced even in comparison with the case in which the simple PET film without the lens sections is used.

Figure 1:
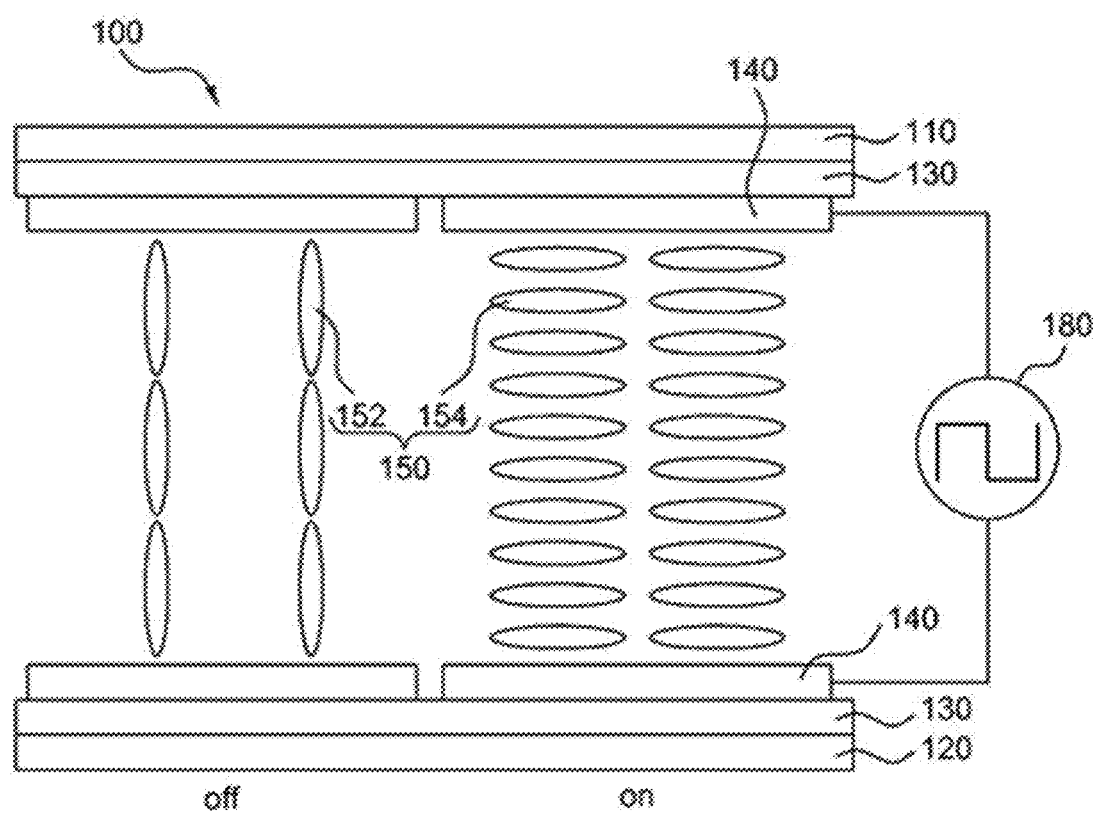
FIG. 1 is a conceptual view schematically showing the basic structure and operating principle of an LCD.
Figure 2:
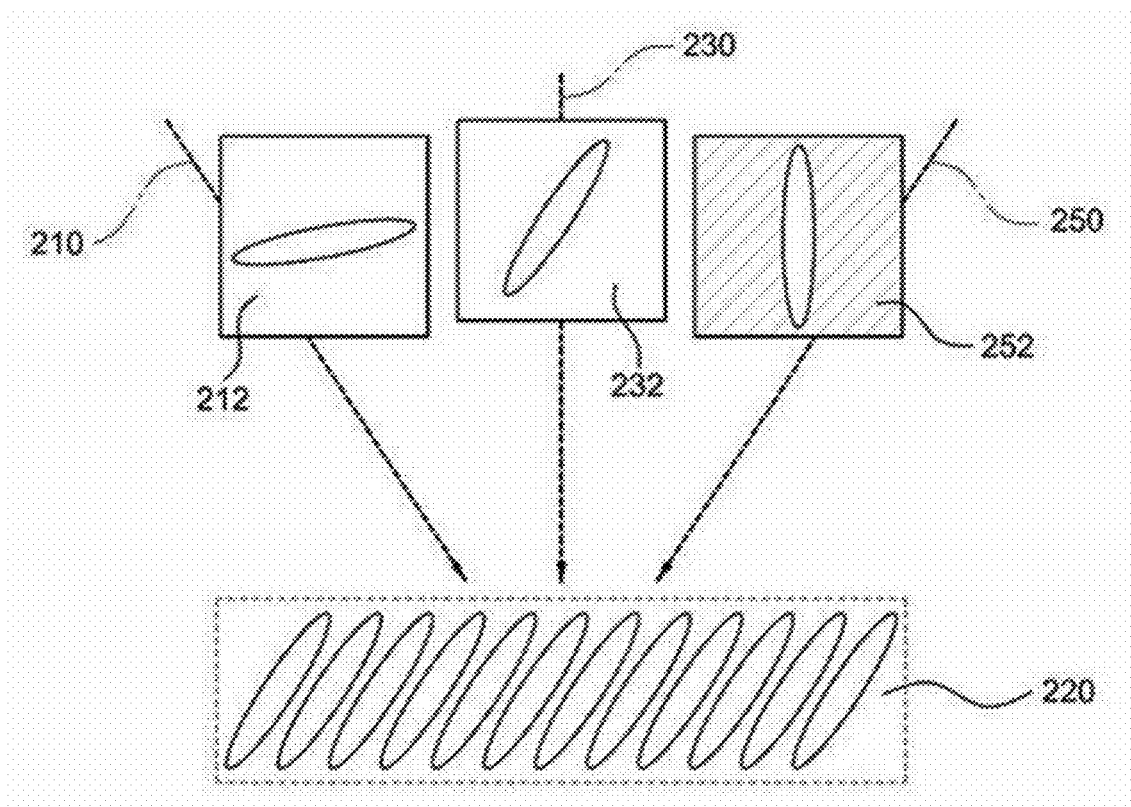
FIG. 2 is a conceptual view showing the orientation and optical transmittance of liquid crystals depending on the viewing angle.
Figure 3:
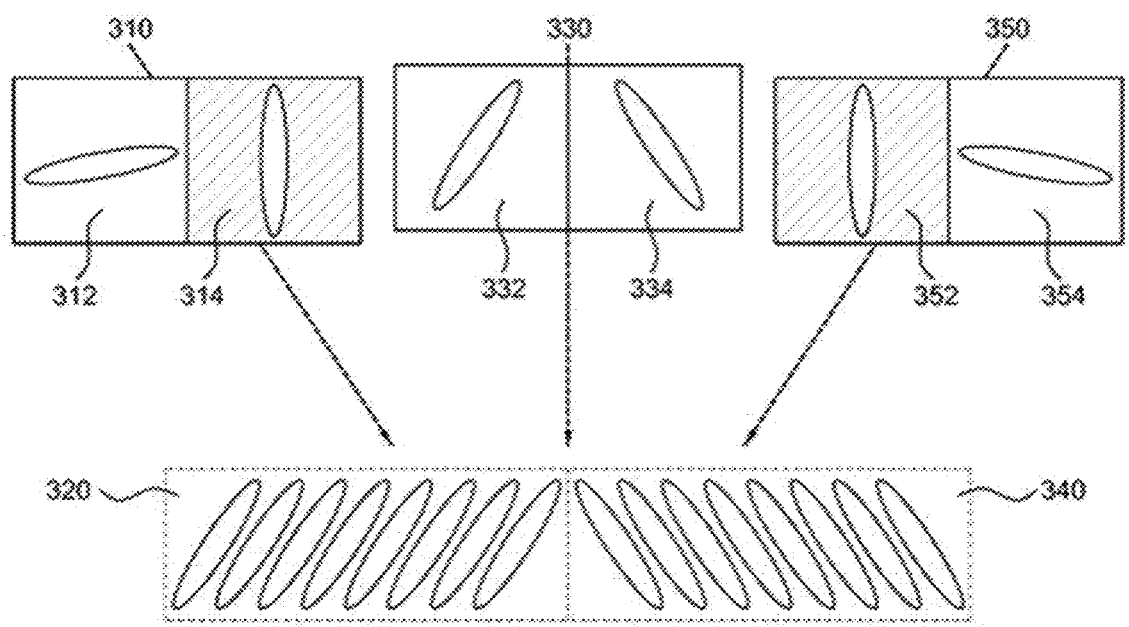
FIG. 3 is a conceptual view showing a conventional attempt to reduce variation in the contrast ratio and color shift depending on the viewing angle.
Figure 4:
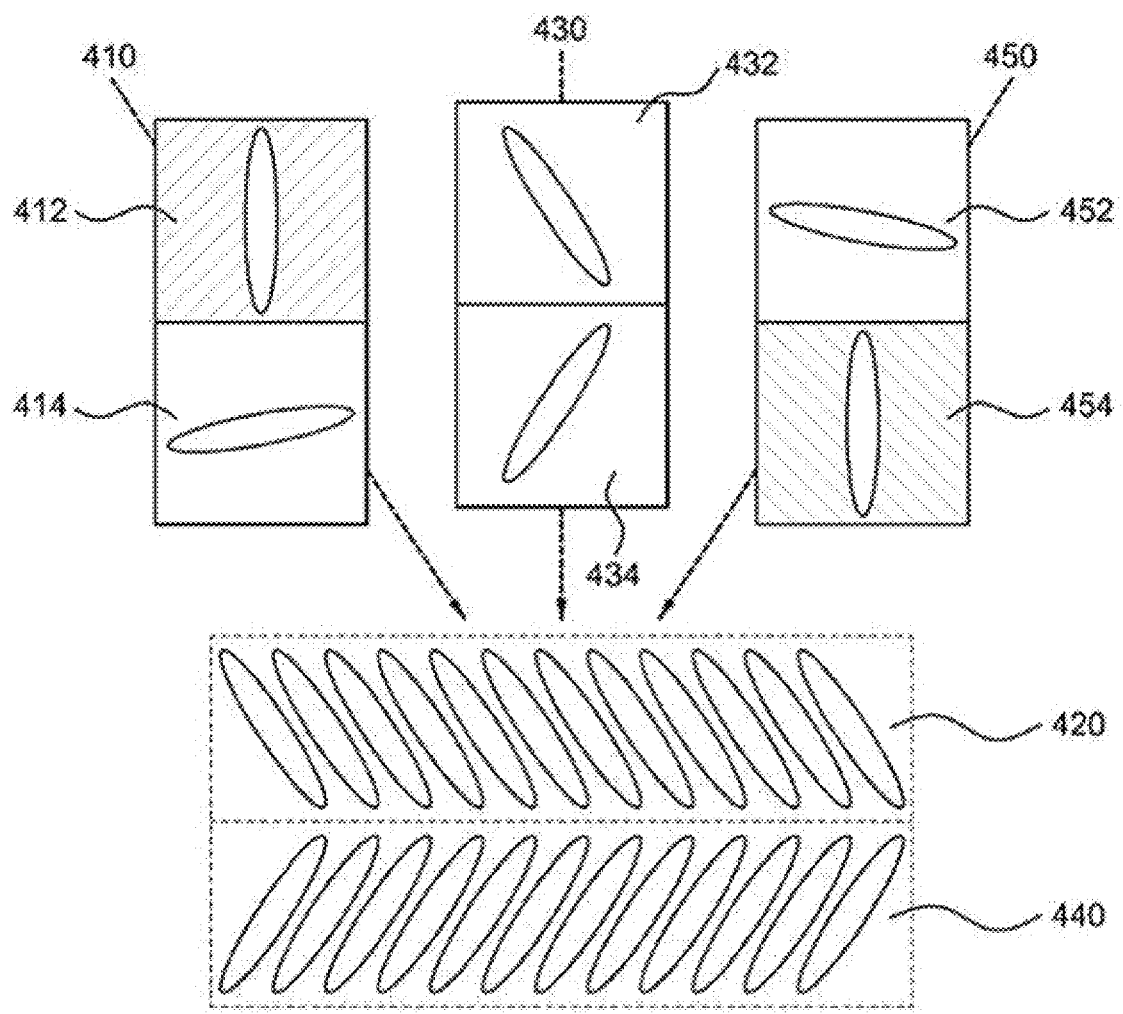
FIG. 4 is a conceptual view showing another conventional attempt to reduce variation in the contrast ratio and color shift depending on the viewing angle.
Figure 5:
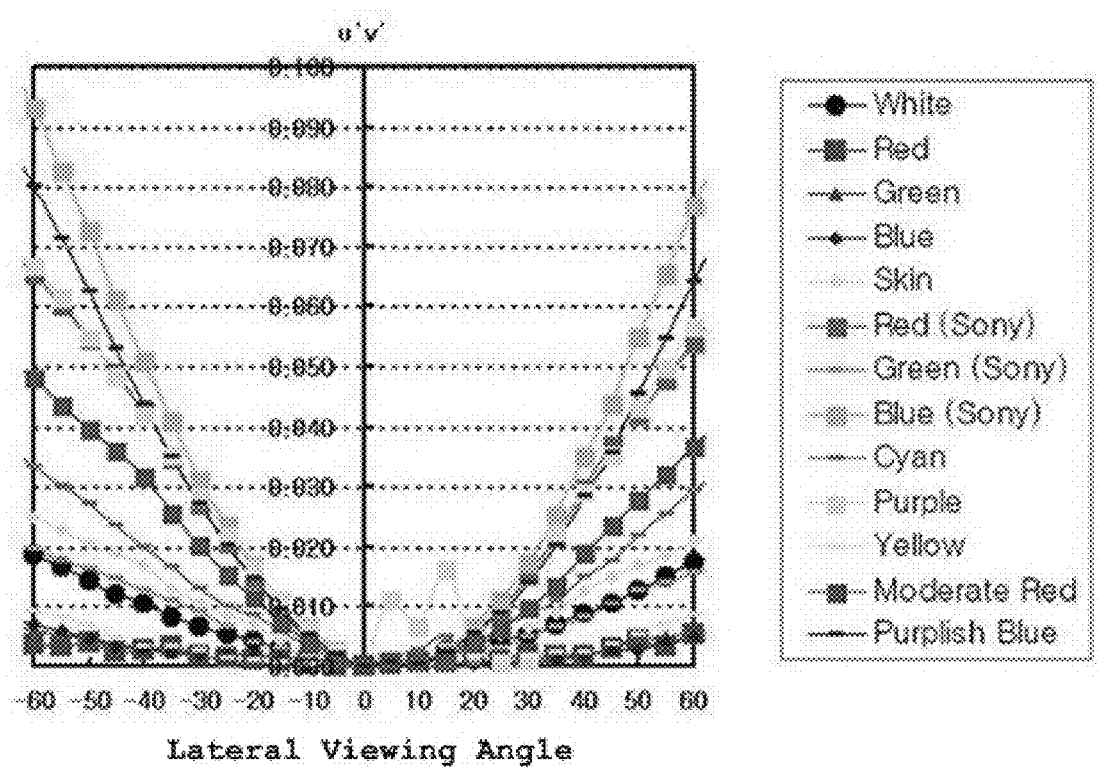
FIG. 5 is a graph showing color shift depending on the viewing angle for an LCD on which an optical film is not mounted.
Figure 18:
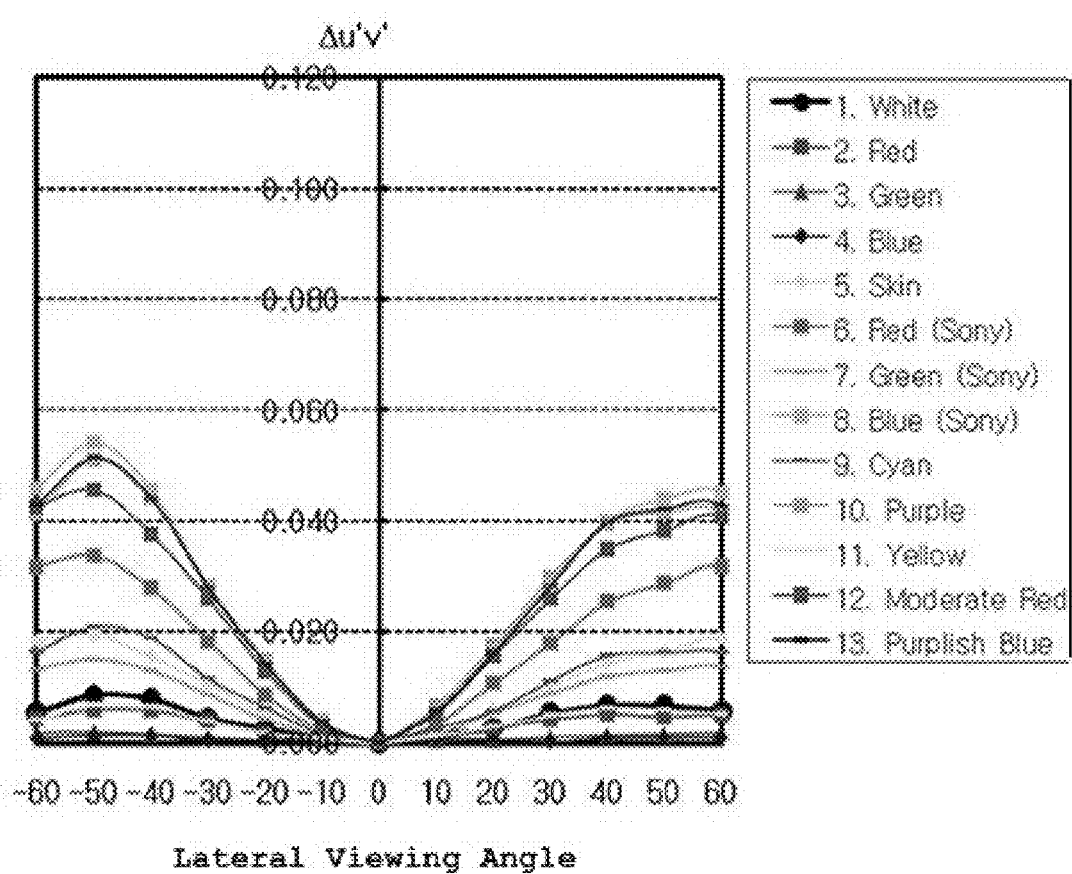
FIG. 18 is a graph showing color shift depending on the viewing angle for an LCD on which the optical film shown in FIG. 17 is mounted, for comparison with that shown in FIG. 5.

FIG. 18 is a graph showing the result obtained by attaching the self-adhesive optical film for reducing color shift (in which lens sections have a semi-elliptical cross-section with a width of 30 μm, a depth of 60 μm, and a pitch of 83 μm), shown in FIG. 17, to the display panel in an S-PVA mode LCD TV, which has the color shift shown in FIG. 5, and then measuring the rate of color shift reduction.

The color shift reduction rate in FIG. 18 was 52%.

Embodiments of the Invention

Color shift was greatly reduced by disposing the optical film of the above-described comparative examples in front of the display panel. Furthermore, the problems of ghosts and hazing can be overcome by disposing the optical film such that it is in close contact with the front portion of the display panel.

In addition, the present invention proposes a scheme to improve the transmissivity of the optical film for reducing color shift.

Figure 19:
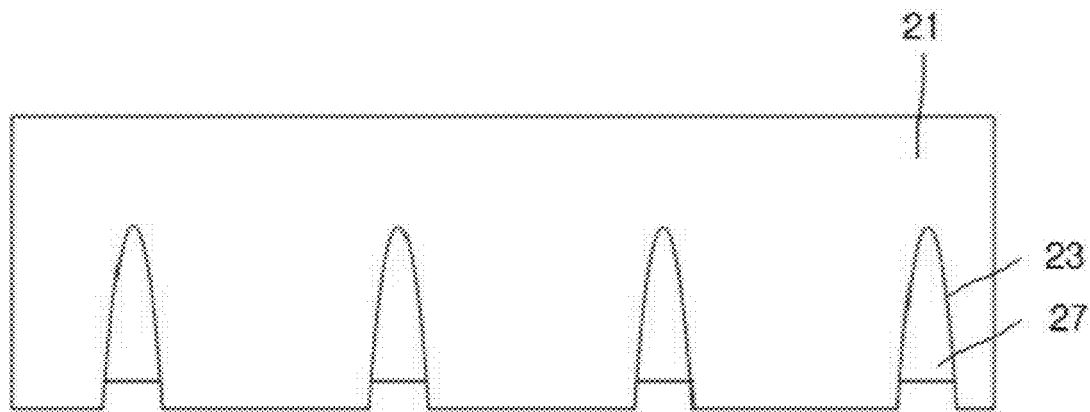
FIG. 19 is a view schematically showing an optical film for reducing color shift according to an exemplary embodiment of the present invention.
Figure 20:
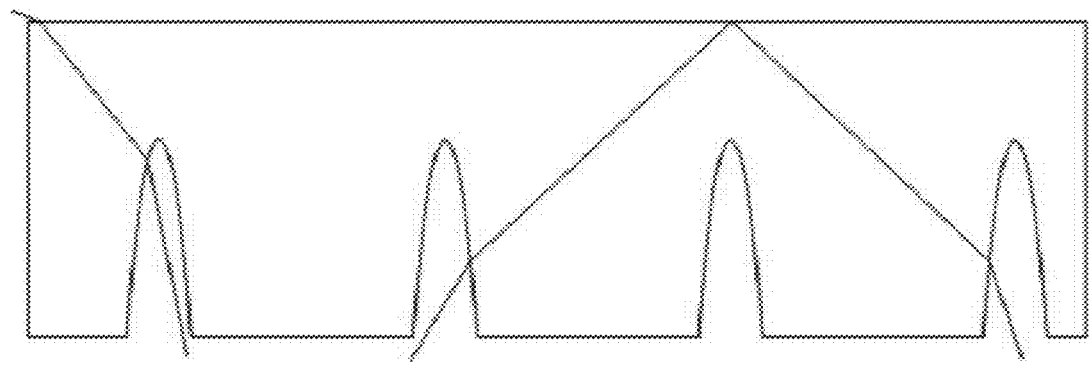
FIG. 20 and FIG. 21 are views explaining the principle by which the transmissivity of the optical film shown in FIG. 19 is increased.
Figure 21:
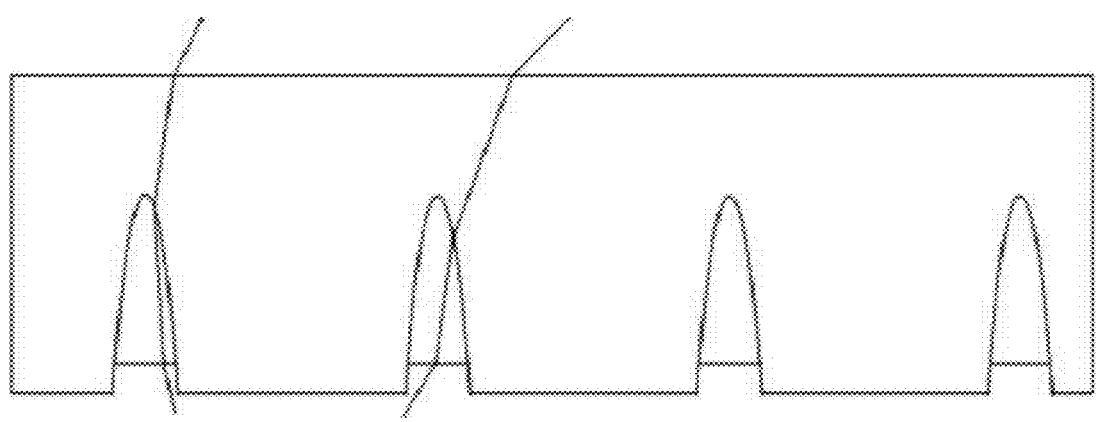

FIG. 19 is a view schematically showing an optical film for reducing color shift according to an embodiment of the present invention, and FIG. 20 and FIG. 21 are views explaining the principle by which the transmissivity of the optical film shown in FIG. 19 is increased.

As shown in these figures, the optical film shown in FIG. 19 includes a background layer 21, engraved lens sections 23 and packed portions 27.

The engraved lens sections 23 are formed on the background layer 21. Here, a plurality of the engraved lens sections is formed such that they are spaced apart from each other. This means that the engraved lens sections, which refract light when passing through the cross-section of the background layer, are spaced apart from each other, and that a flat surface of the background layer is present between adjacent engraved lens sections. Accordingly, the lens sections having a predetermined pattern, e.g., a matrix having a semi-elliptical cross-section, look like a single lens structure having a matrix pattern when they are viewed from the front of the background layer, whereas the lens sections look to be spaced apart from each other when they are viewed on the cross-section of the background layer.

The packed portions 27 are disposed inside the engraved lens sections 23. The refractive index n1 of the background layer 21 and the refractive index n2 of the packed portions 27 must be different from each other. The background layer 21 and the packed portions 27 may be made of transparent polymer resin.

As shown in FIG. 20, when the angle at which light is emitted from the display panel increases, the angle at which light refracted by the lens sections is incident on the front surface of the background layer also increases, such that more light is totally reflected. The light that is totally reflected is absorbed by the polarizer film of the display panel, thereby decreasing the transmissivity of the optical film for reducing color shift.

In order to solve this problem, the material disposed inside the engraved lens sections has a refractive index n2 that is different from the refractive index n1 of the background layer. As shown in FIG. 21, light emitted from the display panel is refracted at the boundary of the packed portion, such that the direction of the light incident onto the lens section is changed. As a result, the angle of the light incident onto the lens section is decreased, such that total reflection does not occur. Consequently, transmissivity can be increased.

It is more preferred that the packed portions be partially packed (to fill part of the engraved lens sections). In particular, when the optical film is in close contact with the display panel, it may not be preferable for the packed portions to completely fill the engraved lens sections, since an air gap (having a refractive index 1) is not interposed between the display panel and the packed portions. That is, when the refractive index of the front glass of the display panel is 1.5, if the packed portions having a refractive index of about 1.5 completely fill the engraved lens sections, the difference between the refractive indexes is less than required. Then, the effect of reducing color shift may become insignificant, and the effect in which light emitted from the display panel is refracted at the boundary of the packed portions so as to decrease total reflection and thus increase transmissivity may also become insignificant.

Table 2 below presents improvement in color change and changes in transmissivity depending on changes in the refractive index n1 of the background layer and on changes in the reflective index n2 of the packed portions. This shows that, when the packed portions are provided, the improvement in color change and the transmissivity are both increased compared to the case in which the lens sections are not filled. This is more significant, for example, when the refractive index of the packed portions is greater than that of the background layer, as in the case of #2.

TABLE 2

|   | Background layer | Packed portion (n2) | Improvement in color change | Transmissivity |
|---|---|---|---|---|
| Ref. | 1.6 | 0 (air) | 34.8% | 79.5% |
| #1 | 1.6 | 1.4 | 43.7% | 79.9% |
| #2 | 1.4 | 1.6 | 45.2% | 85.8% |

The optical filter for a display device of the present invention may be configured as a single film of the background layer in which the packed portions and the lens sections are formed, or as a multi-layer optical filter by layering a variety of functional films, such as a transparent substrate for protecting the panel, an anti-fog film, an anti-reflection film, a polarizer film, and a phase retardation film, on the background layer.

In this case, respective constitutional layers of the optical filter of the present invention may be adhered or bonded using an adhesive or a bonding agent. Specific examples thereof may include, but are not limited to, acrylic adhesives, silicone-based adhesives, urethane-based adhesives, polyvinyl butyral (PMB) adhesives, ethylene vinyl acetate (EVA)-based adhesives, polyvinyl ether (PVE), saturated amorphous polyester, and melamine resins.

The foregoing descriptions of specific exemplary embodiments of the present invention have been presented for the purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to thereby enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An optical film for reducing color shift, the optical film being disposed in front of a display panel, and comprising:
   a background layer;
   a plurality of engraved lens sections formed in the background layer such that the engraved lens sections are spaced apart from each other; and
   packed portions, each of the packed portions being disposed inside only a portion of a respective one of the engraved lens sections such that an air gap is arranged between the display panel and the packed portions,
   wherein a refractive index of the packed portions is different from that of the background layer.

2. The optical film of claim 1, wherein the refractive index of the packed portions is greater than that of the background layer.

3. The optical film of claim 1, wherein the background layer and the packed portions comprise transparent polymer resin.

4. The optical film of claim 1, wherein the background layer is self-adhesive.

5. The optical film of claim 4, wherein the background layer comprises transparent elastomer.

6. The optical film of claim 1, wherein the engraved lens sections have a pattern selected from the group consisting of stripes having a polygonal cross-section, waves having a polygonal cross-section, a matrix having a polygonal cross-section, a honeycomb having a polygonal cross-section, dots having a polygonal cross-section, stripes having a semicircular cross-section, waves having a semicircular cross-section, a matrix having a semicircular cross-section, a honeycomb having a semicircular cross-section, dots having a semicircular cross-section, stripes having a semi-elliptical cross-section, waves having a semi-elliptical cross-section, a matrix having a semi-elliptical cross-section, a honeycomb having a semi-elliptical cross-section, dots having a semi-elliptical cross-section, stripes having a semi-oval cross-section, waves having a semi-oval cross-section, a matrix having a semi-oval cross-section, a honeycomb having a semi-oval cross-section, and dots having a semi-oval cross-section.

7. A display comprising the optical film for reducing color shift of claim 1.

8. The display of claim 7, wherein the lens sections of the optical film for reducing color shift are formed in a surface of the background layer that is directed toward the display panel.

9. The display of claim 7, wherein the optical film for reducing color shift is in close contact with the display panel.

10. The display of claim 9, wherein the optical film for reducing color shift is attached to the display panel by means of an adhesive.

11. The display of claim 9, wherein the background layer is self-adhesive, such that the background layer is directly attached to the display panel.

* * * * *